US010725966B1

(12) United States Patent
Deshmukh et al.

(10) Patent No.: US 10,725,966 B1
(45) Date of Patent: Jul. 28, 2020

(54) BLOCK LEVEL INCREMENTAL BACKUP FOR QCOW2 VIRTUAL DISKS

(71) Applicant: Veritas Technologies LLC, Mountain View, CA (US)

(72) Inventors: Dulipsinh Deshmukh, Assam (IN); Mandar Khanolkar, Maharashtra (IN)

(73) Assignee: Veritas Technologies LLC, Santa Clara, CA (US)

( * ) Notice: Subject to any disclaimer, the term of this patent is extended or adjusted under 35 U.S.C. 154(b) by 696 days.

(21) Appl. No.: 14/318,988

(22) Filed: Jun. 30, 2014

(51) Int. Cl.
G06F 16/30 (2019.01)
G06F 16/11 (2019.01)
G06F 11/14 (2006.01)
G06F 16/188 (2019.01)

(52) U.S. Cl.
CPC ........ *G06F 16/128* (2019.01); *G06F 11/1458* (2013.01); *G06F 16/188* (2019.01)

(58) Field of Classification Search
CPC ................................. G06F 17/30088
See application file for complete search history.

(56) References Cited

U.S. PATENT DOCUMENTS

| 8,438,349 | B2 | 5/2013 | Olson et al. ............ 711/162 |
| 2010/0287348 | A1* | 11/2010 | Sampathkumar ... G06F 11/1458 711/162 |
| 2015/0067283 | A1* | 3/2015 | Basu ...................... G06F 3/061 711/162 |
| 2015/0067390 | A1* | 3/2015 | Blake ................. G06F 9/45558 714/15 |
| 2015/0127612 | A1* | 5/2015 | Balcha ................ G06F 11/1451 707/645 |
| 2015/0248333 | A1* | 9/2015 | Aravot ..................... G06F 3/06 711/162 |

OTHER PUBLICATIONS

McLoughlin, Mark, "The QCOW2 Image Format", available via the Internet at https://people.gnome.org/~markmc/qcow-image-format.html, Sep. 11, 2008, pp. 1-5.
Acronis, "Red Flat Virtualization Backup and Recovery—Acronis Backup," https://www.acronis.com/en-us/business/backup/rhv/ (downloaded Dec. 18, 2018), pp. 1-12.
Bluebridge Networks, "BlueVault Backup and Replication Powered by VEEAM," BlueBridge Networks, http://www.bluebridgenetworks.com/cleveland-cloud-computing/backup-and-replication/ (downloaded Dec. 18, 2018), pp. 1-5.

* cited by examiner

Primary Examiner — Irete F Ehichioya
Assistant Examiner — Johnese Johnson
(74) Attorney, Agent, or Firm — Campbell Stephenson LLP

(57) ABSTRACT

Disclosed herein are various systems and methods for performing block level incremental backup operations for QCOW2 virtual disks. A first snapshot of a virtual disk is taken and used by a virtual machine at a first point in time. The virtual disk is implemented as a QCOW2 image, and taking the first snapshot causes the first snapshot to be stored in the QCOW2 image. A second snapshot of the virtual disk is taken at a second point in time. Taking the second snapshot causes the second snapshot to be stored in the QCOW2 image. One or more blocks of the virtual disk that have been modified between the first point in time and the second point in time are identified using metadata stored in the QCOW2 image. An incremental backup operation is then performed on the virtual disk by copying one or more blocks from the second snapshot to backup storage.

24 Claims, 5 Drawing Sheets

BLOCK LEVEL INCREMENTAL BACKUP FOR QCOW2 VIRTUAL DISKS

FIELD OF THE INVENTION

This invention relates to data storage, and, more particularly, to performing block level incremental backup operations.

DESCRIPTION OF THE RELATED ART

Various data protection techniques are used to improve the availability of data. For example, backup techniques are used to create redundant copies of data. Backup techniques include those that create full backups as well as incremental backups. Full backups are a copy of an entire set of data stored in a particular storage entity. Incremental backups are a copy of only those portions of the set of data that have been modified during a particular time period, such as those portions of the set of data that are modified after a previous backup operation occurs. Incremental backups are often desirable as they minimize storage space and are quicker to perform than full backups.

Virtualization systems allow multiple operating systems (which can actually be separate instances of the same type of operating system) to execute during the same time period on the same hardware. Each executing operating system acts as an independent virtual machine (VM) and can be interacted with and used in substantially the same manner as a standalone operating system executing on independent hardware. VMs allow increased usage of hardware resources by effectively turning one hardware computing device into several VMs.

In storage virtualization, a virtual disk is a logical disk or volume on which a computing device or application performs input/output (I/O) operations in order to access data stored on the virtual disk. A virtual disk can be provided by a storage-virtualization device that is part of a storage area network (SAN). Quick Emulator (QEMU) Copy on Write 2 (QCOW2) is a file format for virtual disk snapshot files used by QEMU, which is an open-source hosted hypervisor that performs hardware virtualization. QCOW2 supports multiple VM snapshots.

For incremental backups to be performed at the block level, information about changed blocks, for example, since a previous backup operation, is necessary. Unfortunately, most virtualized systems that use QCOW2 to implement virtual disks do not provide an application programming interface (or any other interface) via which the backup system can obtain information identifying the blocks that have changed since the last backup. While information about changed blocks on each QCOW2 virtual disk can be gleaned from a client, driver, or tracker installed on a VM or a hypervisor, such extraneous software embedded in a VM or a hypervisor can negatively affect the performance of a virtualization system, and thus many systems will not allow (or at least not recommend) such software to be embedded. Therefore, in virtualization systems that store virtual disks and associated snapshots in QCOW2 format, a computing device tasked with performing incremental backup may not be capable of directly receiving changed block information from the virtual disks and their associated snapshots, and thus may not be able to create incremental backups.

SUMMARY OF THE INVENTION

Various systems and methods for performing block level incremental backup operations for QCOW2 virtual disks are disclosed. The method includes taking a first snapshot of a virtual disk used by a virtual machine at a first point in time. The virtual disk is implemented as a QCOW2 image, and taking the first snapshot causes the first snapshot to be stored in the QCOW2 image.

In one embodiment, the method includes taking a second snapshot of the virtual disk at a second point in time. Taking the second snapshot causes the second snapshot to be stored in the QCOW2 image. In this example, the method identifies one or more blocks of the virtual disk that have been modified between the first point in time and the second point in time, using metadata stored in the QCOW2 image. An incremental backup operation is then performed on the virtual disk by copying one or more blocks from the second snapshot to backup storage.

In certain embodiments, the identifying includes accessing a header of the QCOW2 image. The header identifies all the snapshots stored in the QCOW2 image. In other embodiments, the identifying can also include accessing metadata stored in the first snapshot. The metadata identifies which blocks in the virtual disk were modified subsequent to the first point in time. In some embodiments, the identifying includes identifying snapshots that were taken between the first point in time and the second point in time based upon metadata in the QCOW2 image and accessing each of the identified snapshots.

In one embodiment, the method includes taking a third snapshot of the virtual disk at a third point in time, as part of a subsequent incremental backup operation of the virtual disk at the third point in time. Taking the third snapshot causes the third snapshot to be stored in the QCOW2 image. The method also includes detecting that the second snapshot has been deleted, and in response to the detecting, the subsequent incremental backup operation is aborted. Instead, a full backup operation is performed.

In some embodiments, the method includes causing a snapshot of the entire QCOW2 image to be taken at the first point in time. In this example, the identifying includes accessing the snapshot of the entire QCOW2 image if the first snapshot has been deleted before time T2.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
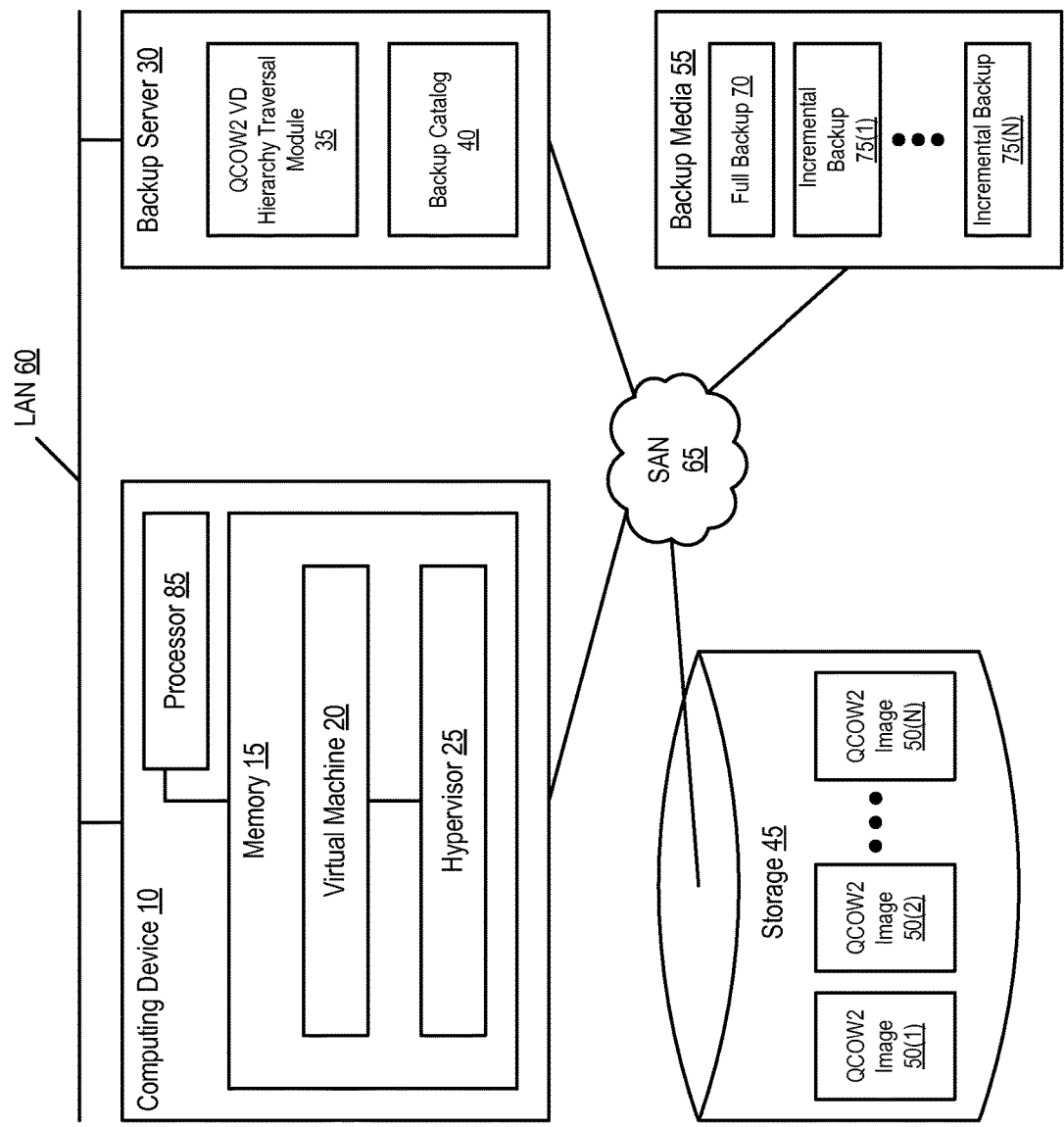
FIG. 1 is a block diagram of a computing system for performing block level incremental backup on virtual disks stored in QCOW2 format, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

One type of backup operation is an incremental backup operation. For an incremental backup operation, a backup application (e.g., a stand-alone application, a backup client, a backup server, a backup agent, or the like) detects what data has been modified since a previous backup was taken. The backup server selects the changed data to be included in an incremental backup. Accordingly, the incremental backup backs up only the data that has been modified since the last backup. To do this, the backup server can detect which data has been modified since the last backup (e.g., by querying another application for information identifying modified data). Data can be modified by operations such as write operations, delete operations, move operations, and the like.

As used herein, a block is a unit of data, such as 1024 bytes. Blocks can be of fixed-size or variable-size, depending upon the implementation. Typically, data is organized into blocks by a storage controller or volume manager. Blocks can be logical groupings, in that each block can be a unit of data within a virtual storage device such as a data volume. The present disclosure refers to blocks throughout, but it is understood that this terminology is used for the sake of clarity, and the present disclosure is not limited to blocks. To the contrary, the operations described herein can utilize any logical or physical grouping of data.

When a backup application is operating at the block level (as opposed to the file level), the backup application will perform incremental backups by only copying those blocks that have been modified since the last backup. A block is considered to have been modified if the value of the block has changed. Thus, a block is considered to be modified if any of the data in that block has been written to, deleted, overwritten, initialized, allocated to a particular file or other data structure (after having previously been allocated), or the like.

In order to identify which blocks to include in an incremental backup, the backup server needs to be able to access information indicating which data has been changed after the backup application most recently performed a backup operation. Once the backup application executes the backup operation, the backup application can, in some situations, cause the information that identifies the data as having been modified since the previous backup operation to be discarded, if that information is no longer needed by the backup application or any other application.

When generating an incremental backup, the backup information copies the value of each of the modified blocks, identified as described above, from their original location to a storage device that stores backups. Unmodified data is not included in the incremental backup (and as such are not copied as part of the incremental backup process), and thus, so long as every block in the device targeted by the backup operation has not been modified, the incremental backup will be smaller than a full backup of the targeted device. As part of a backup, the backup application can also backup metadata associated with the modified data, such as ownership information, access time, size, permissions, and the like.

One way for a backup application to detect whether a block has been changed involves accessing metadata maintained by another application, such as a file system, volume manager, or the like. Often, such applications provide an application programming interface (API) via which the backup application can request information identifying which blocks have changed since the time at which the last backup was performed. Unfortunately, as noted above, in some environments that use QCOW2 format for their virtual disks, such an API may not be available, and it may be undesirable to install an agent into the hypervisor or VMs of the environment. Thus, the backup application is limited in how it can obtain information usable to create incremental backups.

In order to nevertheless be able to perform incremental backups of virtual disks in such an environment, the backup application can be configured to use the features provided by the QCOW2 format to identify the modified blocks needed for a particular incremental backup. In particular, the backup application can leverage the ability of the QCOW2 format to create snapshots, and then use the QCOW2 snapshots to identify blocks that have been modified in a given time period (e.g., since the last backup).

In QCOW2, a virtual disk (e.g., as used by VM) is stored in a QCOW2 image, which is a file that represents the virtual disk as a fixed-size block device. Each QCOW2 image can include both the data stored in the virtual disk as well as one or more snapshots of the virtual disk. Each snapshot is a read-only copy of the virtual disk as it existed at the point in time at which that snapshot is created. When a QCOW2 snapshot is created, the original virtual disk remains writable. If the virtual disk is modified after the snapshot is created, the value of the particular block to be modified on the virtual disk is first copied to the QCOW2 snapshot before the modification is applied to the block.

As described above, and in some embodiments, multiple snapshots can be part of a single QCOW2 image (e.g., a QCOW2 internal snapshot). However, in other embodiments, after each snapshot is created, a separate QCOW snapshot is created that corresponds to each virtual disk (e.g., a QCOW external snapshot).

In at least certain embodiments, when a QCOW2 snapshot is created, the original virtual disk is rendered read-only and only the QCOW2 snapshot is writable. When a second QCOW2 snapshot is taken, the first QCOW2 image is rendered read-only and the second QCOW2 image is writable. In this example, when a block in the snapshot images is modified, the block is copied from the virtual disk to a corresponding QCOW2 image. The same block in the QCOW image is over-written. Therefore, the latest block is always present in the QCOW2 image. When reading the block, a check is performed whether the block exists in the QCOW2 image. If the block is not located in the QCOW2 image, a previous (parent) QCOW2 image is searched to locate the block. In this manner, a hierarchy of QCOW2 images can be accessed and searched to locate and identify modified blocks.

Within the QCOW2 image file for a virtual disk, the QCOW2 maintains metadata that describes the location of the data in the virtual disk as well as each of the snapshots. Furthermore, each of the snapshots identifies which portions of the virtual disk have been modified subsequent to the creation of that snapshot. Thus, instead of querying an API or receiving information from an agent embedded in the virtualization system, the backup application can itself identify the modified blocks to include an incremental backup of a virtual disk by reading the QCOW2 image file for the virtual disk.

More specifically, the backup application can first identify the QCOW2 snapshots in the image for the virtual disk and then read the headers of the identified QCOW2 snapshots. The header of a QCOW2 image identifies the number of snapshots contained in the image (e.g., in the "nb_snapshots" field), as well as the offset within the QCOW2 image at which each snapshot is stored. In particular, for each snapshot the QCOW2 disk includes, the QCOW2 disk header can include a "snapshots_offset field" that gives the offset within the QCOW2 disk at which the header (e.g., "QCowSnapshotHeader") of that snapshot can be found. This offset information identifies the snapshots in order (e.g., from oldest to newest, or vice versa). Accordingly, the QCOW2 disk header information allows the backup application to identify the snapshots within the QCOW2 disk and where those snapshots are located.

Since the backup application now knows where the snapshots are located in the QCOW2 disk, the backup application can access the header of each snapshot. This header includes information indicating the identity of the snapshot (e.g., by name and/or number in a string that follows the snapshot header), information identifying when the snapshot was created (e.g., in the "date_sec" and/or "date_nsec" fields), and information indicating which blocks were modified since the snapshot was created (e.g., in a copy of the L1 table, which follows the snapshot header in a location identified by the "l1_table_offset" and/or "l1_size" fields of the snapshot header). The information indicating the identity and/or creation time of each snapshot can be used to identify the subset of snapshots that are needed for a particular incremental backup. For example, the backup system can cause the hypervisor to create a new snapshot each time the backup application creates a backup of that virtual disk. The backup application can store information identifying that snapshot (e.g., by storing the snapshot name, identifier, and/or creation time). The next time the backup application needs to create a backup of the virtual disk, the backup application can cause a new snapshot to be created. The backup application can then search the image for the virtual disk for snapshots. If both the new snapshot and the snapshot taken at the prior backup time are available, the backup application can identify the prior snapshot, as well as any intervening snapshots taken between the time of the prior snapshot and the time of the new snapshot, as being the snapshots that need to be used for the backup.

In some embodiments, the backup application determines the hierarchy of all external QCOW snapshots. In this example, the backup application identifies all QCOW snapshots (e.g., a leaf QCOW snapshot and a parent QCOW snapshot) to determine the hierarchy of all external QCOW snapshots. The backup application reads the header of the QCOW virtual disk (e.g., QCowHeader), instead of the header of the QCOW2 snapshot (e.g., QCowSnapshotHeader) and accesses metadata about the QCOW2 image and the file name associated with the QCOW2 image. As discussed above, tables (e.g., L1 tables and L2 tables) can be accessed to get information about modified blocks within that QCOW snapshot. Therefore, in this example (and for QCOW external snapshots generally), the backup application does not need to read the QCowSnapshotHeader, but instead, can determine the hierarchy of all external QCOW2 snapshots just by reading the QCowHeader.

Now that the backup application has identified the relevant snapshots to be used in generating the incremental backup, the backup application can access each of these snapshots in order to identify which blocks have been modified between the time at which the prior backup was taken, and the time at which the most recent snapshot was taken. In particular, QCOW2 images can maintain tables (e.g., L1 tables and L2 tables) that show where each particular block of data in the virtual disk and snapshots is located. Some tables can indicate where blocks of the virtual disk are stored in the image. Additionally, each snapshot can include a table that indicates where the blocks of the snapshot are located. For unmodified blocks (in this situation, blocks that have not been modified since the snapshot was created), this table will simply indicate that the blocks are stored as part of the virtual disk, and thus the virtual disk tables can be used to find the specific location of these blocks. For blocks that have been modified since the snapshot was created, however, the table will indicate that the blocks are stored as part of the snapshot (since the value of these blocks was overwritten in the virtual disk). Accordingly, the tables maintained in the QCOW2 image indicate which blocks were modified subsequent to the creation of each snapshot. This process of identifying relevant snapshots, and then relevant blocks, can be referred to as traversing the QCOW2 virtual disk hierarchy, and can be performed by a QCOW2 VD traversal module.

FIG. 1 is a block diagram of a virtualization system that is coupled to a backup server. The system of FIG. 1 can be configured to perform block level incremental backup on virtual disks stored in QCOW2 format. As shown, the system includes a computing device 10 coupled to a backup server 30 and a backup server 30 coupled by a local area network (LAN) 60 (any other appropriate network or interconnection can be used instead of and/or in addition to LAN 60).

Computing device 10 implements a virtualization system, which includes a hypervisor 25 and one or more virtual machines such as virtual machine (VM) 20. Hypervisor 25 manages the VMs. In one embodiment, the hypervisor is implemented using software such as Red Hat® Enterprise Virtualization. The hypervisor uses QCOW2 format to implement the virtual disks used by the VMs, which are stored in storage device 45. While this example shows a single VM in the virtualization system, it is noted that alternative embodiments can implement different numbers of VMs per computing device than shown. Additionally, a virtualization system can include additional computing devices that each implement the same or different number of VMs than other computing devices within the same virtualization system.

Backup server 30 is a computing device configured as a backup server (e.g., by executing backup server software available from Symantec Corporation of Mountain View, Calif.). Backup server 30 includes a QCOW2 virtual disk (VD) hierarchy traversal module 35 and a backup catalog 40, which will be described in more detail below. Backup server is configured to create backups of the virtual disks used by VMs such as VM 20, and to store those backups on backup media 55.

Computing device 10 and backup server 30 are, in this example, coupled by SAN 65 to storage 45 and backup media 55. In alternative embodiments, computing device 10 and/or backup server 30 can be coupled to storage 45 and/or backup media 55 by any other appropriate network and/or interconnection. Storage 45 and backup media 55 can each include one or more of a variety of different storage devices, including hard drives, compact discs, digital versatile discs, solid state drive (SSD), memory such as Flash memory, and the like, or an array (e.g., a just a bunch of disks (JBOD) array, redundant array of inexpensive disks (RAID) array, compact or digital versatile dis jukebox, or the like) or such storage devices.

Storage 45 stores the virtual disks used by virtual machine 20. As shown, this data is logically sub-divided into QCOW2 images 50(1)-50(N). Each image represents a different VD. Additionally, as described above, each image can contain one or more snapshots of the VD represented by that image.

Backup server 30 is configured to backup virtual machine 20 by copying the VDs used by virtual machine 20 to backup media 55. Backup media 55 can store a variety of backups, including various full and incremental backups. In this example, backup media 55 stores a full backup 70 and N (which may not be the same number as the number of QCOW2 images; N is simply meant to represent any integer) incremental backups 75(1)-75(N).

Backup catalog 40 identifies the contents of each backup on backup media 55 so that the backups can be used to restore VM 20 to any desired point-in-time represented by one of the backups by restoring the VDs used by that VM. In this example, backup catalog 40 is stored on backup server 30. In other embodiments, backup catalog 40 may also be stored in whole or in part on storage 45 and/or backup media 55 instead of or in addition to being stored on the backup server.

Each incremental backup 75(1)-75(N) is taken subsequent to another full or incremental backup. At least one full backup is taken before any incremental backups can be taken.

In order to backup VM 20, backup server 30 can obtain information identifying the VD(s) used by VM 20 from hypervisor 25. Backup server 30 can then cause hypervisor 25 to generate a snapshot of each of the identified VD(s) and create a backup from these snapshots. Initially, backup server 30 will need to create a full backup, in which all of the data in the VDs is copied and stored on the backup media (e.g., in full backup 70). Each time backup server 30 requests a snapshot of a VD, the backup server can store information identifying that snapshot (e.g., by storing the name and/or number identifying the snapshot, as obtained from hypervisor 25 after backup server 30 requests the snapshot, by storing information identifying the time at which the snapshot was created, and the like). This information can then be used to perform incremental backups.

In order to increase various efficiencies (e.g., bandwidth consumed by the backup, storage required for the backup, time taken to complete the backup, etc.), backup server 30 can be configured to create one or more incremental backups after the full backup has been taken. In order to create an incremental backup of the VDs used by the VM, the backup server will access each QCOW2 image that represents a VD being included in the backup. In each image, backup server 30 reads the QCOW2 image header to find all of the snapshots included within that image. Then, backup server 30 uses the information the backup server stored identifying the snapshot taken at the time of the last backup as well as the information the backup server stored identifying the snapshot taken at the time of the current incremental backup. Using this information and the information in the snapshot headers of the QCOW2 image, backup server 30 then identifies which of the snapshots in the QCOW2 image file are needed for the current backup. Particularly, backup server 30 identifies all snapshots created between the time at which the snapshot corresponding to the most recent backup was taken, and the time at which the snapshot corresponding to the current backup was taken.

After identifying the relevant snapshots, backup server 30 then identifies the blocks that have been modified subsequent to the time at which each of the relevant snapshots was taken. This can be done by reading tables (e.g., L1 tables) within each of the relevant snapshots in the QCOW2 image. Backup server 30 can create a list of blocks that have been modified, and then these blocks can be copied from storage device 45 to backup media 55 and stored in an incremental backup.

Figure 2:
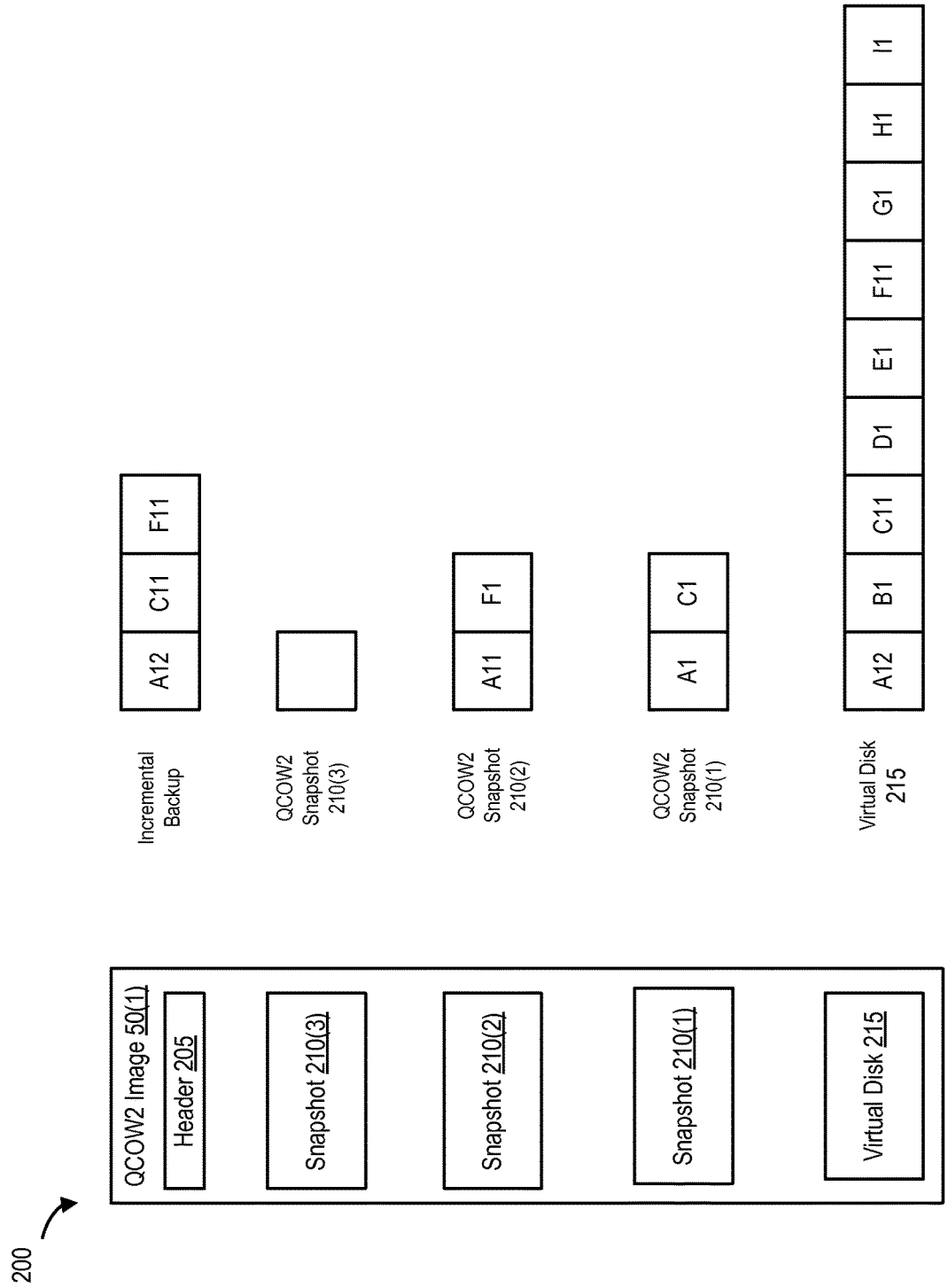
FIG. 2 is a block diagram that illustrates traversing the hierarchy of multiple virtual disk snapshots to determine information about changed blocks, according to one embodiment of the present invention.

FIG. 2 is a block diagram that illustrates how QCOW2 snapshots can be used to determine information about which blocks of the underlying VD have been modified since the creation of those snapshots. As shown, a QCOW2 image 50(1) includes a header 205, several snapshots (210(1), 210(2), and 210(3)), and a virtual disk 215. Additionally, each snapshot 210(1)-210(3) includes a header. Image 50(1) can include various metadata in addition to the header, such as tables that identify the data that is stored in the virtual disk and each snapshot.

As illustrated in FIG. 2, all snapshots are part of a single QCOW2 image (e.g., a QCOW 2 internal snapshot). However, in some embodiments, a separate QCOW2 image is generated for each snapshot (e.g., a QCOW2 external snapshot) (not shown in FIG. 2). In the manner described above, the header and metadata of each QCOW2 image can be accessed to identify modified blocks.

In this example, the virtual disk initially stores values A1, B1, C1, D1, E1, F1, G1, H1, and I1 in blocks A-I. At time T1, snapshot 210(1) is created to be a copy of virtual disk 215 at time T1. Subsequently, the VM modifies blocks A and C so that these blocks store new values A11 and C11 respectively. Before these modification are applied to the virtual disk, the original values of blocks A and C are copied to snapshot 210(1). Accordingly, snapshot 210(1) stores values A1 and C1.

Next, at time T2, snapshot 210(2) is created to be a copy of virtual disk 215 at time T2. At this time T2, the value of the virtual disk is A11, B1, C11, D1, E1, F1, G1, H1, and IL. Subsequently, the VM modifies blocks A and F to have new values A12 and F11. Before these modifications are applied, the values of those blocks are first copied to snapshot 210(2). As such, snapshot 210(2) stores vales A11 and F1.

At time T3, snapshot 210(3) is created to be a copy of virtual disk 215 at time T3. In this example, no modifications have yet happened subsequent to time T3, so no values have been copied into this snapshot.

Assuming that snapshot 210(1) was created at the time of a full backup and snapshot 210(3) was created at the time of an incremental backup, the data to include in the incremental backup can be identified by accessing image 50(1). First, the backup application can locate snapshots 210(1) and 210(3) (e.g., using the QCOW2 image header and snapshot headers, as described above). Then, the backup application can identify that snapshot 210(2) was generated at a time T2 between T1 and T3 and should thus be included in the incremental backup. Now, the backup application can access each of snapshots 210(1)-210(3) in order identify the blocks that have been modified between T1 and T3 (e.g., using tables within each snapshot to locate data blocks that have been copied into each snapshot). Accordingly, the incremental backup taken at time T3 will include the most recent value of all of the blocks that were modified between times T1 and T3. As such, the incremental backup will include blocks A, C, and F, since snapshots 210(1) and 210(2) indicate that these blocks have been modified subsequent to time T1 at which the full backup was taken. To get the most values of these blocks at time T3 at which the incremental backup is being taken, the backup application accesses snapshot 210(3), which stores the copy of the virtual disk 215 at time T3. Here, since no data has been modified since T3, snapshot 210(3) simply indicates that the correct values of these blocks can be read from virtual disk 215. However, if any of these blocks had been modified subsequent to time T3, snapshot 210(3) would store the values of those blocks at time T3 and thus could be read from the snapshot.

Figure 3:
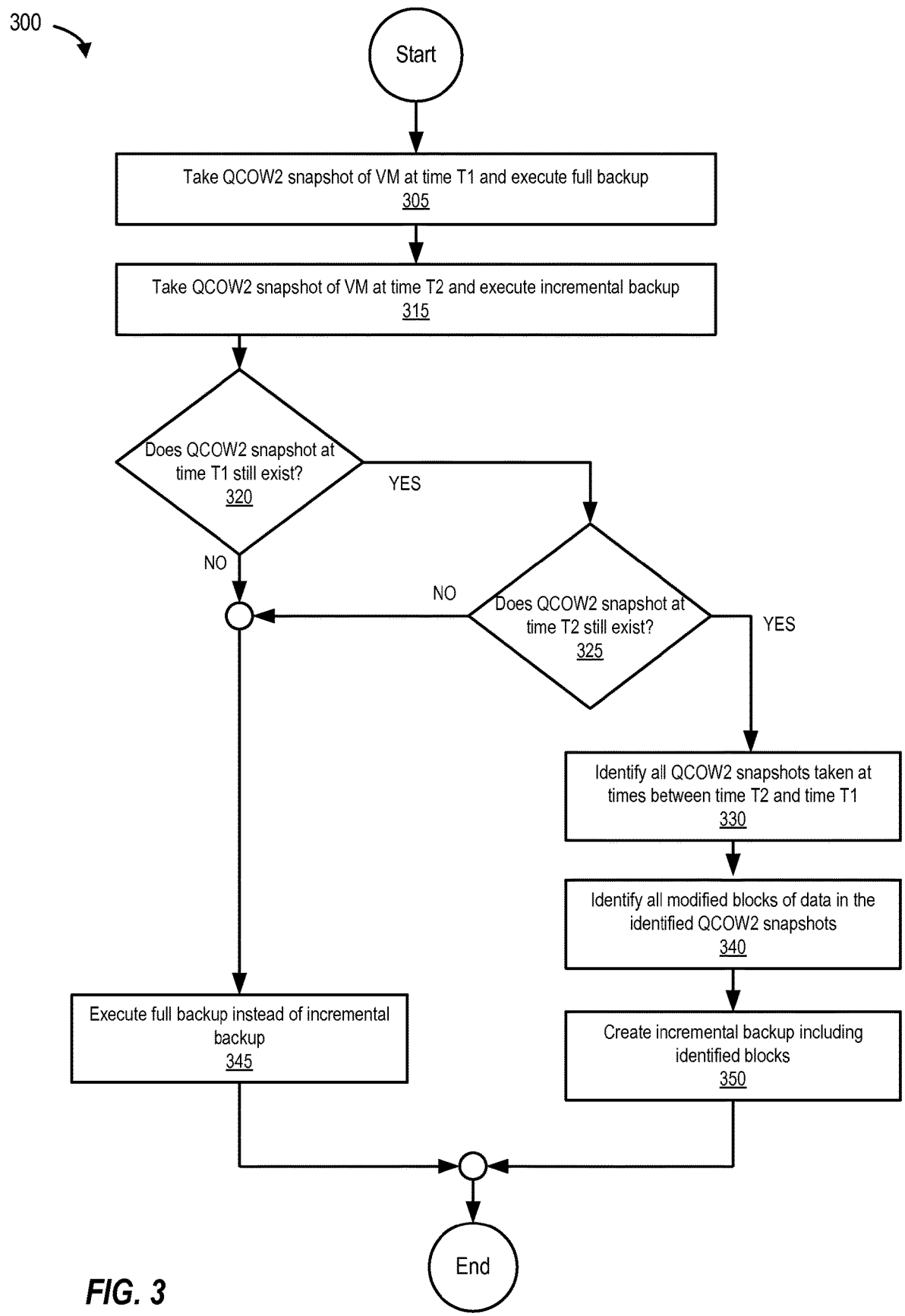
FIG. 3 is a flowchart of a method of performing incremental backup operations on virtual disks stored in QCOW2 format, according to one embodiment of the present invention.

FIG. 3 is a flowchart of a method of identifying changed blocks of data in a QCOW2 VD. The method begins at 305 by taking a QCOW2 snapshot of a VM (e.g., VM 20 of FIG. 1) at time T1 and executing a full backup. The snapshot of the VM is taken by creating a snapshot of each VD used by the VM. At 315, the method proceeds to taking a QCOW2 snapshot of the VM (e.g., VM 20) at time T2 and executes an incremental backup. At 320, the method determines whether the QCOW2 snapshot taken at time T1 still exists. If the QCOW2 snapshot taken at time T1 does not exist, the method reverts to step 345 and takes a full backup of the VM, since without that snapshot, the backup system will not have enough information to identify which blocks have changed subsequent to time T1.

If the QCOW2 snapshot taken at time T1 does exist, the method moves to 325 to determine whether the QCOW2 snapshot taken at time T2 still exists (again, if not, a full backup will need to be taken, as shown at 345, since the backup system will not have a stable copy of the VM at time T2 from which to read the backup data).

If the QCOW2 snapshots taken at times T1 and T2 exist, the method, at 330, identifies all QCOW2 snapshots taken between times T2 and T1 (e.g., by reading the QCOW2 image(s) of the virtual disk(s) being backed up, as described above, in order to first identify the locations of all the snapshots, and then to access metadata in each snapshot to see whether that snapshot was taken in the time period of interest between T1 and T2). At 340, the method identifies all of the blocks that have been modified during the time period of interest by accessing each of the QCOW2 snapshots identified in 330. For example, each snapshot can include a table that indicates whether a particular value of a block included in the snapshot can be found in the virtual disk or within the snapshot itself. Blocks whose values have been copied into the snapshot are blocks that have been modified subsequent to the creation of the snapshot. The backup application can make a list of each modified block discovered by accessing the snapshots.

Once the modified blocks have been identified, an incremental backup that includes those blocks is created, as shown at 350. Creating the incremental backup involves reading the value of each of the blocks identified at 340 from the snapshot created at time T2.

As shown in FIG. 3, if a component of the virtualization system deletes a snapshot needed by the backup application, the backup application may have to revert to taking a full backup instead of being able to create an incremental backup. In order to avoid this situation, the backup application may decide to take an additional snapshot of the entire virtualization system (e.g., including all of the QCOW2 images in their entirety, instead of just taking a snapshot of the VD within a QCOW2 image as described above) each time a backup is taken. This way, even if the virtualization system deletes a snapshot within a QCOW2 image, the backup system will still be able to access all of the relevant QCOW2 metadata (e.g., in the image header, snapshot headers, tables, etc.) from the snapshot of the QCOW2 images.

In some embodiments, all of the operations in FIG. 3 are performed by a backup application such as backup server 30 of FIG. 1. More particularly, operations 330 and 340 can be performed by a QCOW2 VD traversal module included within a backup application. In other embodiments, some of the operations can be performed instead by a proxy server. For example, a proxy server can act as an intermediary for backup server 30 when requesting snapshots from a hypervisor. In another example, backup server 30, instead of being implemented as the depicted standalone machine, can be implemented on a hypervisor (e.g., hypervisor 25). However, the backup server, no matter how it is implemented, independently and directly (or via a network like SAN 65) accesses QCOW2 VD metadata and traverses the hierarchy of QCOW2 snapshots to identify changed blocks of data to perform incremental backup operations without requiring the use or assistance of an intermediate and/or extraneous hardware or software device (e.g., a tracking driver inside the VM or hypervisor).

Figure 4:
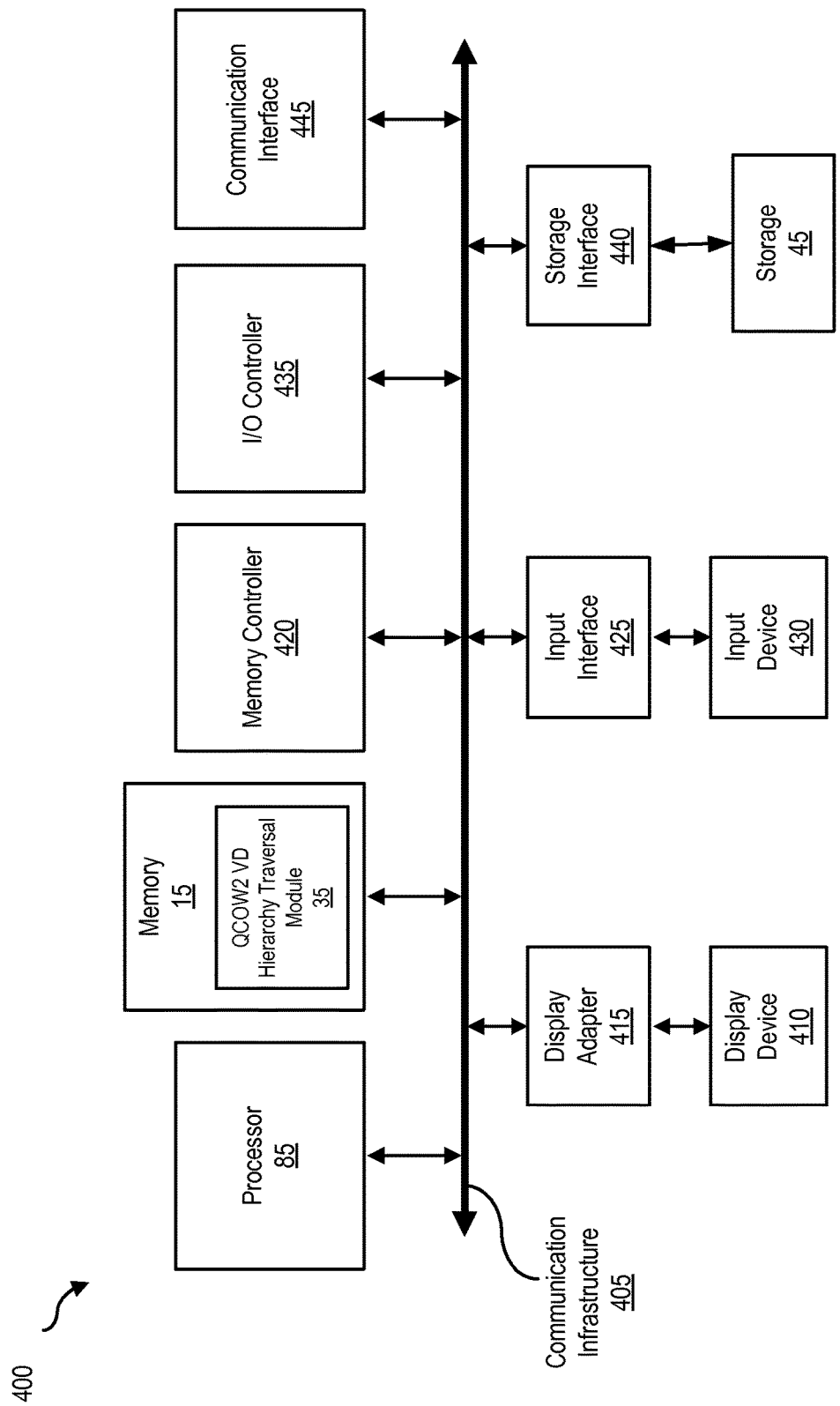
FIG. 4 is a block diagram of a computing system, illustrating how a QCOW2 virtual disk hierarchy traversal module can be implemented in software, according to one embodiment of the present invention.

FIG. 4 is a block diagram of a computing system 400 capable of implementing computing device 20 and/or backup server 30 as described above. Computing system 400 broadly represents any single or multi-processor computing device or system capable of executing computer-readable instructions. Examples of computing system 400 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 400 may include at least one processor 85 and a memory 15. By executing the software that implements computing device 20 and/or backup server 30, computing system 400 becomes a special purpose computing device that is configured to perform a block level incremental backup for QCOW2 virtual disks.

Processor 85 generally represents any type or form of processing unit capable of processing data or interpreting and executing instructions. In certain embodiments, processor 85 may receive instructions from a software application or module. These instructions may cause processor 85 to perform the functions of one or more of the embodiments described and/or illustrated herein. For example, processor 85 may perform and/or be a means for performing all or some of the operations described herein. Processor 85 may also perform and/or be a means for performing any other operations, methods, or processes described and/or illustrated herein.

Memory 15 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 400 may include both a volatile memory unit and a non-volatile storage device. In one example, program instructions implementing a block level incremental operation may be loaded into memory 15.

In certain embodiments, computing system 400 may also include one or more components or elements in addition to processor 85 and memory 15. For example, as illustrated in FIG. 4, computing system 400 may include a memory controller 420, an Input/Output (I/O) controller 435, and a communication interface 445, each of which may be interconnected via a communication infrastructure 405. Communication infrastructure 405 generally represents any type or form of infrastructure capable of facilitating communication between one or more components of a computing device. Examples of communication infrastructure 405 include, without limitation, a communication bus (such as an Industry Standard Architecture (ISA), Peripheral Component Interconnect (PCI), PCI express (PCIe), or similar bus) and a network.

Memory controller 420 generally represents any type or form of device capable of handling memory or data or controlling communication between one or more components of computing system 400. For example, in certain embodiments memory controller 420 may control communication between processor 85, memory 15, and I/O controller 435 via communication infrastructure 405. In certain embodiments, memory controller 420 may perform and/or be a means for performing, either alone or in combination with other elements, one or more of the operations or features described and/or illustrated herein.

I/O controller 435 generally represents any type or form of module capable of coordinating and/or controlling the input and output functions of a computing device. For example, in certain embodiments I/O controller 435 may control or facilitate transfer of data between one or more elements of computing system 400, such as processor 85, memory 15, communication interface 445, display adapter 415, input interface 425, and storage interface 440.

Communication interface 445 broadly represents any type or form of communication device or adapter capable of facilitating communication between computing system 400 and one or more additional devices. For example, in certain embodiments communication interface 445 may facilitate communication between computing system 400 and a private or public network including additional computing systems. Examples of communication interface 445 include, without limitation, a wired network interface (such as a network interface card), a wireless network interface (such as a wireless network interface card), a modem, and any other suitable interface. In at least one embodiment, communication interface 445 may provide a direct connection to a remote server via a direct link to a network, such as the Internet. Communication interface 445 may also indirectly provide such a connection through, for example, a local area network (such as an Ethernet network), a personal area network, a telephone or cable network, a cellular telephone connection, a satellite data connection, or any other suitable connection.

In certain embodiments, communication interface 445 may also represent a host adapter configured to facilitate communication between computing system 400 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 445 may also allow computing system 400 to engage in distributed or remote computing. For example, communication interface 445 may receive instructions from a remote device or send instructions to a remote device for execution.

As illustrated in FIG. 4, computing system 400 may also include at least one display device 410 coupled to communication infrastructure 405 via a display adapter 415. Display device 410 generally represents any type or form of device capable of visually displaying information forwarded by display adapter 415. Similarly, display adapter 415 generally represents any type or form of device configured to forward graphics, text, and other data from communication infrastructure 405 (or from a frame buffer, as known in the art) for display on display device 410.

As illustrated in FIG. 4, computing system 400 may also include at least one input device 430 coupled to communication infrastructure 405 via an input interface 425. Input device 430 generally represents any type or form of input device capable of providing input, either computer or human generated, to computing system 400. Examples of input device 430 include, without limitation, a keyboard, a pointing device, a speech recognition device, or any other input device.

As illustrated in FIG. 4, computing system 400 may also include storage 45 coupled to communication infrastructure 405 via a storage interface 440. Storage 45 generally represents any type or form of storage device or medium capable of storing data and/or other computer-readable instructions. For example, storage 45 may include a magnetic disk drive (e.g., a so-called hard drive), a floppy disk drive, a magnetic tape drive, an optical disk drive, a flash drive, or the like. Storage interface 440 generally represents any type or form of interface or device for transferring and/or transmitting data between storage 45 and other components of computing system 400.

In certain embodiments, storage 45 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage 45 may also include other similar structures or devices for allowing computer software, data, or other computer-readable instructions to be loaded into computing system 400. For example, storage 45 may be configured to read and write software, data, or other computer-readable information. Storage 45 may also be a part of computing system 400 or may be a separate device accessed through other interface systems.

Many other devices or subsystems may be connected to computing system 400. Conversely, all of the components and devices illustrated in FIG. 4 need not be present to practice the embodiments described and/or illustrated herein. The devices and subsystems referenced above may also be interconnected in different ways from that shown in FIG. 4.

Computing system 400 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 400 for storage in memory via a network such as the Internet or upon a carrier medium.

The computer-readable medium containing the computer program may be loaded into computing system 400. All or a portion of the computer program stored on the computer-readable medium may then be stored in memory 15 and/or various portions of storage 45. When executed by processor 85, a computer program loaded into computing system 400 may cause processor 85 to perform and/or be a means for performing the functions of one or more of the embodiments described and/or illustrated herein. Additionally or alternatively, one or more of the embodiments described and/or illustrated herein may be implemented in firmware and/or hardware. For example, computing system 400 may be configured as an application specific integrated circuit (ASIC) adapted to implement one or more of the embodiments disclosed herein.

Figure 5:
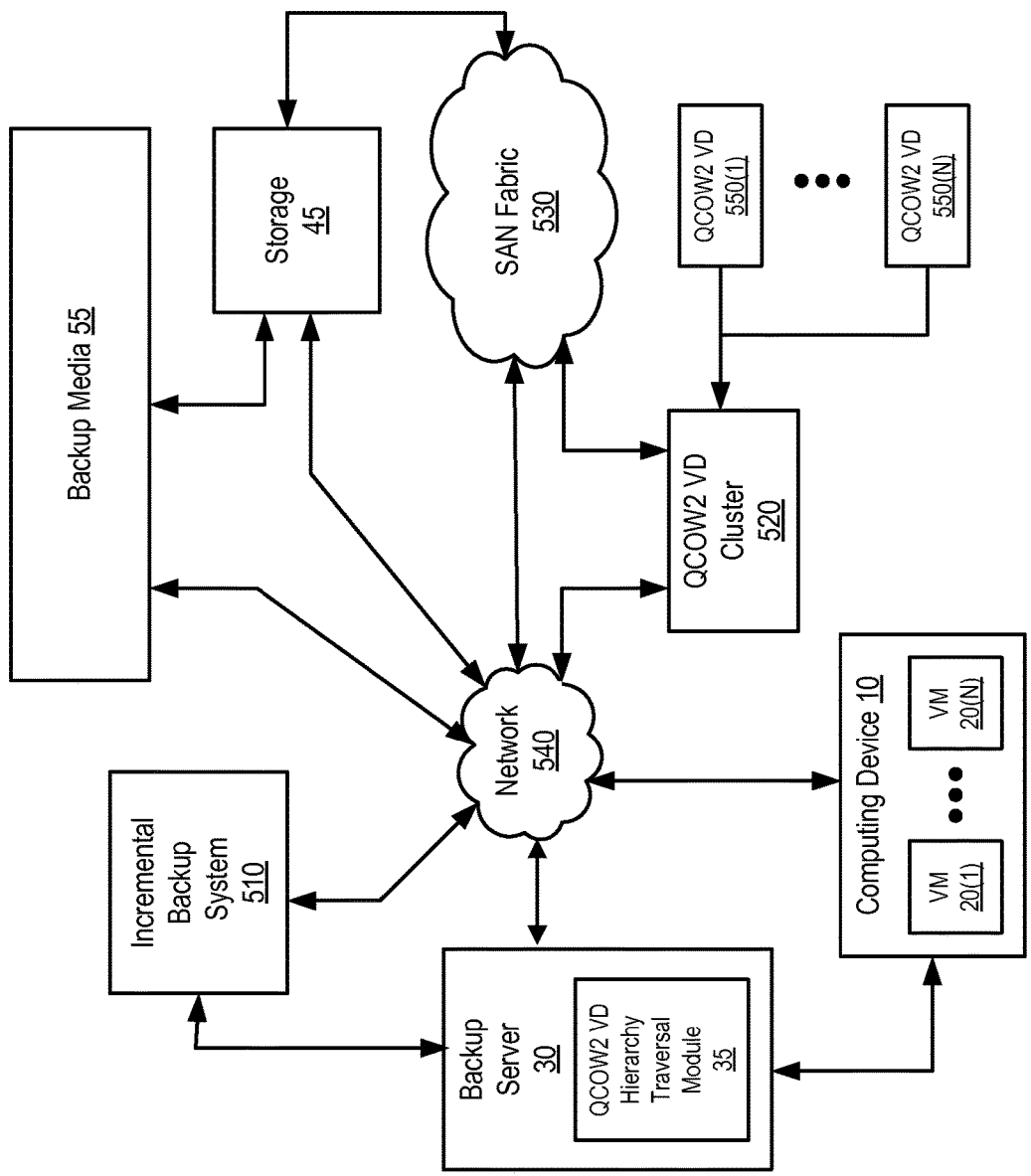
FIG. 5 is a block diagram of a networked system, illustration how various computing devices can communicate via a network, according to one embodiment of the present invention.

FIG. 5 is a block diagram of a network architecture 500 in which backup server 30, computing device 10, and backup media 55 may be coupled to network 540. As illustrated in FIG. 5, backup server 30 may be attached to backup media 55 through network 50. In certain embodiments, network-attached storage (NAS) devices may be configured to communicate with backup server 30 using various protocols, such as Network File System (NFS), Server Message Block (SMB), or Common Internet File System (CIFS).

Storage 45 may also be connected to a network 540. Network 540 generally represents any type or form of computer network or architecture capable of facilitating communication between multiple computing devices. Network 540 may facilitate communication between backup server 30 and storage 45. In certain embodiments, and with reference to computing system 400 of FIG. 4, a communication interface, such as communication interface 445 in FIG. 4, may be used to provide connectivity between backup server 30 and network 50. It should be noted that the embodiments described and/or illustrated herein are not limited to the Internet or any particular network-based environment. For example, network 540 can be a Storage Area Network (SAN).

In at least one embodiment, all or a portion of one or more of the embodiments disclosed herein may be encoded as a computer program and loaded onto and executed by backup server 30, storage 45 or any combination thereof. All or a portion of one or more of the embodiments disclosed herein may also be encoded as a computer program, stored in backup server 30, computing device 10, and distributed over network 540.

In some examples, all or a portion of the computing device in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a QCOW2 virtual disk hierarchy traversal module may transform behavior of a backup server in order to cause the server to perform block level incremental backups for QCOW2 virtual disks.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
   taking a plurality of snapshots of a virtual disk used by a virtual machine, wherein
      the taking the plurality of snapshots causes each snapshot of the plurality of snapshots to be stored in a Quick Emulator Copy on Write 2 (QCOW2) image;
   determining whether a first snapshot of the plurality of snapshots and a second snapshot of the plurality of snapshots exist in the QCOW2 image, wherein
      the first snapshot was taken at a first point in time, and
      the second snapshot was taken at a second point in time; and
   in response to a determination that the first snapshot and the second snapshot exist in the QCOW2 image,
      identifying one or more snapshots of the plurality of snapshots, other than the first snapshot and the second snapshot, wherein
         each of the one or more snapshots was taken at a corresponding point in time that is between the first point in time and the second point in time,
      identifying one or more blocks of the virtual disk that have been modified between the first point in time and the second point in time, using metadata stored in the QCOW2 image, wherein
         the metadata is associated with the one or more snapshots, and
      performing an incremental backup operation on the virtual disk by copying the one or more blocks from the second snapshot to backup storage; and
   in response to a determination that at least one of the first snapshot or the second snapshot does not exist in the QCOW2 image,
      performing a full backup operation on the virtual disk.

2. The computer-implemented method of claim 1, wherein the identifying the one or more snapshots comprises:
   accessing a header of the QCOW2 image, wherein
      the header identifies each snapshot of the plurality of snapshots.

3. The computer-implemented method of claim 1, wherein the identifying the one or more blocks comprises:
   accessing metadata stored in the first snapshot, wherein
      the metadata stored in the first snapshot identifies at least one block in the virtual disk that was modified subsequent to the first point in time.

4. The computer-implemented method of claim 1, wherein the identifying the one or more blocks comprises:
   identifying a plurality of snapshots taken between the first point in time and the second point in time, using the metadata; and
   accessing each of the plurality of snapshots taken between the first point in time and the second point in time, wherein the accessing is performed by traversing the plurality of snapshots taken between the first point in time and the second point in time.

5. The computer-implemented method of claim 4, further comprising:
taking a third snapshot of the virtual disk at a third point in time, wherein
the taking the third snapshot causes the third snapshot to be stored in the QCOW2 image;
initiating a subsequent incremental backup operation of the virtual disk at the third point in time;
determining whether the second snapshot has been deleted; and
in response to a determination that the second snapshot has been deleted,
aborting the subsequent incremental backup operation, and
performing a full backup operation.

6. The computer-implemented method of claim 1, comprising causing a snapshot of the QCOW2 image to be taken at the first point in time, wherein
the identifying the one or more snapshots comprises accessing the snapshot of the QCOW2 image, if the first snapshot has been deleted before the second point in time.

7. A non-transitory computer readable storage medium storing program instructions executable to:
take a plurality of snapshots of a virtual disk used by a virtual machine, wherein
the plurality of snapshots being taken causes each snapshot of the plurality of snapshots to be stored in a Quick Emulator Copy on Write 2 (QCOW2) image;
determine whether a first snapshot of the plurality of snapshots and a second snapshot of the plurality of snapshots exist in the QCOW2 image, wherein
the first snapshot was taken at a first point in time, and the second snapshot was taken at a second point in time; and
in response to a determination that the first snapshot and the second snapshot exist in the QCOW2 image,
identify one or more snapshots of the plurality of snapshots, other than the first snapshot and the second snapshot, wherein
each of the one or more snapshots was taken at a corresponding point in time that is between the first point in time and the second point in time,
identify one or more blocks of the virtual disk that have been modified between the first point in time and the second point in time, using metadata stored in the QCOW2 image, wherein
the metadata is associated with the one or more snapshots, and
perform an incremental backup operation on the virtual disk by copying the one or more blocks from the second snapshot to backup storage; and
in response to a determination that at least one of the first snapshot or the second snapshot does not exist in the QCOW2 image,
perform a full backup operation on the virtual disk.

8. The non-transitory computer readable storage medium of claim 7, wherein the program instructions executable to identify the one or more snapshots comprise further program instructions executable to:
access a header of the QCOW2 image, wherein
the header identifies each snapshot of the plurality of snapshots.

9. The non-transitory computer readable storage medium of claim 7, wherein the program instructions executable to identify the one or more blocks comprise further program instructions executable to:
access metadata stored in the first snapshot, wherein
the metadata stored in the first snapshot identifies at least one block in the virtual disk that was modified subsequent to the first point in time.

10. The non-transitory computer readable storage medium of claim 7, wherein the program instructions executable to identify the one or more blocks comprise further program instructions executable to:
identify a plurality of snapshots taken between the first point in time and the second point in time, using the metadata; and
access each of the plurality of snapshots taken between the first point in time and the second point in time, wherein
the each of the plurality of snapshots taken between the first point in time and the second point in time are accessed by traversing the plurality of snapshots taken between the first point in time and the second point in time.

11. The non-transitory computer readable storage medium of claim 10, wherein the program instructions further comprise program instructions executable to:
take a third snapshot of the virtual disk at a third point in time, wherein
the third snapshot being taken causes the third snapshot to be stored in the QCOW2 image; and
initiating a subsequent incremental backup operation of the virtual disk at the third point in time.

12. The non-transitory computer readable storage medium of claim 11, wherein the program instructions further comprise program instructions executable to:
determine whether the second snapshot has been deleted; and
in response to a determination that the second snapshot has been deleted,
abort the subsequent incremental backup operation, and
perform a full backup operation.

13. The non-transitory computer readable storage medium of claim 7, wherein the program instructions further comprise program instructions executable to:
cause a snapshot of the QCOW2 image to be taken at the first point in time, wherein
the program instructions executable to identify the one or more snapshots comprise program instructions executable to
access the snapshot of the QCOW2 image, if the first snapshot has been deleted before the second point in time.

14. A system comprising:
one or more processors; and
a memory coupled to the one or more processors, wherein
the memory stores program instructions executable by the one or more processors to
take a plurality of snapshots of a virtual disk used by a virtual machine, wherein
the plurality of snapshots being taken causes each snapshot of the plurality of snapshots to be stored in a Quick Emulator Copy on Write 2 (QCOW2) image,
determine whether a first snapshot of the plurality of snapshots and a second snapshot of the plurality of snapshots exist in the QCOW2 image, wherein the first snapshot was taken at a first point in time, and the second snapshot was taken at a second point in time, and in response to a determination that the first snapshot and the second snapshot exist in the QCOW2 image, identify one or more snapshots of the plurality of snapshots, other than the first snapshot and the second snapshot, wherein each of the one or more snapshots was taken at a corresponding point in time that is between the first point in time and the second point in time, identify one or more blocks of the virtual disk that have been modified between the first point in time and the second point in time, using metadata stored in the QCOW2 image, wherein the metadata is associated with the one or more snapshots, and perform an incremental backup operation on the virtual disk by copying the one or more blocks from the second snapshot to backup storage; and in response to a determination that at least one of the first snapshot or the second snapshot does not exist in the QCOW2 image, perform a full backup operation on the virtual disk.

15. The system of claim 14, wherein the program instructions executable by the one or more processors to identify the one or more snapshots comprise further program instructions executable by the one or more processors to:

access a header of the QCOW2 image, wherein
the header identifies each snapshot of the plurality of snapshots.

16. The system of claim 14, wherein the program instructions executable by the one or more processors to identify the one or more snapshots comprise further program instructions executable by the one or more processors to:

access metadata stored in the first snapshot, wherein
the metadata stored in the first snapshot identifies at least one block in the virtual disk that was modified subsequent to the first point in time.

17. The system of claim 16, wherein the program instructions executable by the one or more processors to identify the one or more snapshots comprise further program instructions executable by the one or more processors to:

identify a plurality of snapshots taken between the first point in time and the second point in time, using the metadata; and access each of the plurality of snapshots taken between the first point in time and the second point in time, wherein the each of the plurality of snapshots taken between the first point in time and the second point in time are accessed by traversing the plurality of snapshots taken between the first point in time and the second point in time.

18. The system of claim 17, wherein the program instructions executable by the one or more processors further comprise program instructions executable by the one or more processors to:

take a third snapshot of the virtual disk at a third point in time, wherein
the third snapshot being taken causes the third snapshot to be stored in the QCOW2 image; and initiating a subsequent incremental backup operation of the virtual disk at the third point in time.

19. The system of claim 18, wherein the program instructions executable by the one or more processors further comprise program instructions executable by the one or more processors to:

determine whether the second snapshot has been deleted; and in response to a determination that the second snapshot has been deleted,
abort the subsequent incremental backup operation, and perform a full backup operation.

20. The system of claim 14, wherein the program instructions executable by the one or more processors further comprise program instructions executable by the one or more processors to:

cause a snapshot of the QCOW2 image to be taken at the first point in time, wherein
the program instructions executable to identify the one or more snapshots comprise program instructions executable to
access the snapshot of the QCOW2 image, if the first snapshot has been deleted before the second point in time.

21. The computer-implemented method of claim 1, wherein the determining whether the first snapshot and the second snapshot exist in the QCOW2 image comprises:

determining whether the first snapshot has been deleted from the QCOW2 image.

22. The computer-implemented method of claim 1, wherein the taking the first snapshot causes the first snapshot to be stored in the QCOW2 image as part of a previous full backup operation, and the taking of the second snapshot causes the second snapshot to be stored in the QCOW2 image as part of a previous incremental backup operation.

23. The computer-implemented method of claim 1, wherein the full backup operation is performed without traversing a hierarchy of the QCOW2 image.

24. The computer-implemented method of claim 1, wherein the virtual machine is managed by a hypervisor, and
the incremental backup operation is performed without execution of a tracking driver by the virtual machine or the hypervisor.

* * * * *